(12) United States Patent
Khait et al.

(10) Patent No.: US 11,115,417 B2
(45) Date of Patent: Sep. 7, 2021

(54) SECURED ACCESS CONTROL TO CLOUD-BASED APPLICATIONS

(71) Applicant: Microsoft Technology Licensing, LLC., Redmond, WA (US)

(72) Inventors: Vitaly Khait, Yavne (IL); Ami Luttwak, Ramat Gan (IL); Liran Moysi, Ramat Gan (IL); Ariel Stolovich, Jerusalem (IL); Greg Vishnepolsky, Rehovot (IL)

(73) Assignee: Microsoft Technology Licensing, LLC., Redmond, WA (US)

( * ) Notice: Subject to any disclaimer, the term of this patent is extended or adjusted under 35 U.S.C. 154(b) by 786 days.

(21) Appl. No.: 15/082,768

(22) Filed: Mar. 28, 2016

(65) Prior Publication Data

US 2016/0344736 A1 Nov. 24, 2016

Related U.S. Application Data

(60) Provisional application No. 62/163,623, filed on May 19, 2015.

(51) Int. Cl.
*H04L 29/06* (2006.01)
*G06F 21/33* (2013.01)
*H04W 12/08* (2021.01)

(52) U.S. Cl.
CPC ............ *H04L 63/102* (2013.01); *G06F 21/33* (2013.01); *G06F 21/335* (2013.01);
(Continued)

(58) Field of Classification Search
CPC ... H04L 63/102; H04L 63/1433; H04W 12/08
See application file for complete search history.

(56) References Cited

U.S. PATENT DOCUMENTS

| 8,769,063 B2 | 7/2014 | Barton et al. |
| 8,813,174 B1 | 8/2014 | Koeten et al. |

(Continued)

FOREIGN PATENT DOCUMENTS

| CN | 102449635 A | 5/2012 |
| CN | 102457480 A | 5/2012 |

(Continued)

OTHER PUBLICATIONS

"International Preliminary Report on Patentability Issued in PCT Application No. PCT/US2016/027128", dated Apr. 10, 2017, 6 Pages.

(Continued)

*Primary Examiner* — Victor Lesniewski
(74) *Attorney, Agent, or Firm* — M&B IP Analysts, LLC

(57) ABSTRACT

A method and proxy device for securing an access to a cloud-based application are presented. In an embodiment, the method includes receiving an authentication token that includes an identity of a user of a client device requesting an access to the cloud-based application. The method further includes receiving, from an agent executed in the client device, a client certificate; retrieving, from a compliance server, a device posture of the client device, wherein the device posture is retrieved respective of the received client certificate; identifying an access policy for the client device to access the cloud-based application, and determining whether to grant an access to the cloud-based application based in part on the compliance of the client device with the identified access policy. In an embodiment, the access policy is identified based at least on the retrieved device posture.

26 Claims, 4 Drawing Sheets

(52) U.S. Cl.
CPC ...... *H04L 63/0807* (2013.01); *H04L 63/0815* (2013.01); *H04L 63/0823* (2013.01); *H04L 63/0884* (2013.01); *H04L 63/10* (2013.01); *H04W 63/1433* (2013.01); *H04W 12/08* (2013.01); *G06F 2221/2101* (2013.01); *G06F 2221/2141* (2013.01)

(56) References Cited

U.S. PATENT DOCUMENTS

| | | | |
|---|---|---|---|
| 8,973,088 | B1 | 3/2015 | Leung et al. |
| 9,154,488 | B2 | 10/2015 | Innes et al. |
| 9,210,157 | B1 | 12/2015 | Kim et al. |
| 9,705,919 | B1* | 7/2017 | Jacobsen ............... H04L 63/20 |
| 9,894,099 | B1* | 2/2018 | Jacobsen ............... H04L 63/20 |
| 9,928,377 | B2* | 3/2018 | Narayanaswamy ........................ G06F 21/6218 |
| 10,075,472 | B2* | 9/2018 | Leung ................... H04L 63/20 |
| 2010/0115578 | A1 | 5/2010 | Nice et al. |
| 2013/0024919 | A1 | 1/2013 | Wetter et al. |
| 2013/0086670 | A1* | 4/2013 | Vangpat ............... H04L 9/3213 726/8 |
| 2013/0097710 | A1* | 4/2013 | Basavapatna .......... H04W 4/02 726/25 |
| 2013/0275748 | A1 | 10/2013 | Lu |
| 2013/0290719 | A1* | 10/2013 | Kaler ................... G06F 21/41 713/168 |
| 2014/0006347 | A1 | 1/2014 | Qureshi et al. |
| 2014/0020072 | A1 | 1/2014 | Thomas |
| 2015/0012977 | A1 | 1/2015 | Huh et al. |
| 2015/0089569 | A1* | 3/2015 | Sondhi ................. H04L 63/08 726/1 |
| 2015/0089571 | A1 | 3/2015 | Srinivasan et al. |
| 2015/0188907 | A1* | 7/2015 | Khalid ............... H04L 63/0815 726/8 |
| 2015/0200969 | A1* | 7/2015 | Leung ................... H04L 63/00 726/1 |
| 2016/0088019 | A1* | 3/2016 | Li ........................ G06F 21/53 726/1 |
| 2017/0324733 | A1* | 11/2017 | Howry ................. G06F 21/577 |

FOREIGN PATENT DOCUMENTS

| | | |
|---|---|---|
| WO | 2015126136 A1 | 8/2015 |
| WO | 2016009245 A1 | 1/2016 |

OTHER PUBLICATIONS

"International Search Report & Written Opinion Issued in PCT Application No. PCT/US2016/027128", dated Jun. 28, 2016, 10 Pages.

"Cloud Access Gateway", Published on: Jun. 27, 2015 Available at: https://managedmethods.com/products/cloud-access-gateway/.

"How to Secure Identities in the Cloud (Or Anywhere) Via STS", In White Papers of SecureAuth, Feb. 8, 2016, pp. 1-16.

"Rackspace Cloud Identity API 2.0", Retrieved on: Feb. 8, 2016 Available at: https://developer.rackspace.com/docs/cloud-identity/v2/developer-guide/.

Simons, Alex, "Cloud based Identity and Access Management for every user on every device", Published on: Mar. 25, 2014 Available at: https://blogs.technet.microsoft.com/ad/2014/03/25/cloud-based-identity-and-access-management-for-every-user-on-every-device/.

"Second Office Action Issued in Chinese Patent Application No. 201680028210.9", dated Aug. 13, 2020, 16 Pages.

"Final Office Action Issued in Chinese Patent application No. 201680028210.9", dated Oct. 10, 2020, 15 Pages.

"First Office Action and Search Report Issued in Chinese Patent Application No. 201680028210.9", dated Mar. 16, 2020, 22 Pages.

* cited by examiner

SECURED ACCESS CONTROL TO CLOUD-BASED APPLICATIONS

CROSS-REFERENCE TO RELATED APPLICATIONS

This application claims the benefit of U.S. Provisional Application No. 62/163,623 filed on May 19, 2015, the contents of which are hereby incorporated by reference.

BACKGROUND

In recent years more and more providers offer the ability to create computing environments in the cloud. For example, Amazon Web Services™ (also known as AWS) launched in 2006 a service that provides users with the ability to configure an entire environment tailored to an application executed over a cloud-computing platform. In general, such services allow for developing scalable applications in which computing resources are utilized to support efficient execution of the application.

Organizations and businesses that develop, provide, or otherwise maintain cloud-based applications have become accustomed to relying on these services and implementing various types of environments, from complex websites to applications and services provided as software-as-a-service (SaaS) delivery model. Such services and applications are collectively referred to as "cloud-based applications."

Cloud-based applications are typically accessed by users using a client device via a web browser. Cloud-based applications include, among others, e-commerce applications, social media applications, enterprise applications, gaming applications, media sharing applications, storage applications, software development applications, and so on. Many individual users, businesses, and enterprises turn to cloud-based applications in lieu of "traditional" software applications that are locally installed and managed. For example, an enterprise can use Office® 365 online services for email accounts, rather than having an Exchange® Server maintained by the enterprise.

As greater reliance is made on cloud-based applications, the access to such applications from a web browser must be completely secured. For example, for an e-commerce application executed in a cloud-based platform, any unauthorized access and/or data breach must be prevented.

Providers of cloud computing platforms offer various security capabilities primary designed to protect their infrastructure against cyber-attacks (e.g., DoS, DDoS, etc.). However, cloud computing platforms are not designed to detect any unauthorized and/or unsecured access to cloud-based applications hosted therein.

Most, if not all, cloud-based applications implement a native access control often limited to a username and password (also known as login information). More advanced solutions would require another layer of authentication using, for example, a software certificate and/or two-step authentication. However, the authentication solutions currently available are agnostic to the user's device.

That is, a user can authenticate from any client device using the same credentials and have the same trust level and permission to a cloud-based application's functions regardless of whether the client device is being utilized to access the application. For example, a user can access the Office® 365 email account from his/her work computer and from his/her home computer using the same login information.

As not all client devices are configured with the same security level, the existing solutions for gaining access to cloud-based applications impose significant vulnerabilities. Referring to the above example, the work computer may be fully secured, while the home computer may not have been installed with anti-malware software. As such, any access from the home computer to sensitive documents (e.g., emails) can be downloaded and distributed by malicious code that may exist in the home computer.

In sum, conventional authentication solutions do not provide any application access control based on the security measures of client devices. Specifically, conventional authentication solutions do not distinguish between managed and unmanaged client devices attempting to access a cloud-based application. A managed device is typically secured by an IT personnel of an organization, while an unmanaged client device is not. Referring to the above example, the work computer is a managed device while the home computer is an unmanaged device.

It would therefore be advantageous to provide a solution that overcomes the deficiencies noted above by providing secured access control to cloud-based applications.

SUMMARY

This Summary is provided to introduce a selection of concepts in a simplified form that are further described below in the Detailed Description. This Summary is not intended to identify key features or essential features of the claimed embodiments, nor is it intended to be used to limit the scope of the various claimed embodiments. Moreover, the sole purpose of this Summary is to present some concepts of one or more embodiments in a simplified form as a prelude to the more detailed description that is presented later. For convenience, the term "some embodiments" or "various embodiments" may be used herein to refer to a single embodiment or multiple embodiments of the disclosure.

Some embodiments disclosed herein include a method for securing an access to a cloud-based application. The method comprises receiving an authentication token, wherein the authentication token includes an identity of a user of a client device requesting an access to the cloud-based application; receiving, from an agent executed in the client device, a client certificate; retrieving, from a compliance server, a device posture of the client device, wherein the device posture is retrieved respective of the received client certificate; identifying an access policy for the client device to access the cloud-based application, wherein the access policy is identified based at least on the retrieved device posture; and determining whether to grant an access to the cloud-based application based in part on the compliance of the client device with the identified access policy.

Some embodiments disclosed herein also include a proxy device for securing an access to a cloud-based application. The system comprises a processing system; and a memory, the memory containing instructions that, when executed by the processing system, configure the proxy device to: receive an authentication token, wherein the authentication token includes an identity of a user of a client device requesting an access to the cloud-based application; receive, from an agent executed in the client device, a client certificate; retrieve, from a compliance server, a device posture of the client device, wherein the device posture is retrieved respective of the received client certificate; identify an access policy for the client device to access the cloud-based application, wherein the access policy is identified based at least on the retrieved posture; and determine whether to grant an access to the cloud-based application based in part on the compliance of the client device with the identified access policy.

Some embodiments disclosed herein also include a cloud computing platform comprising: at least one server configured to host at least one cloud-based application; a compliance server; a proxy device communicatively connected to the at least one server, wherein the proxy device includes a processing system and a memory; the memory containing instructions that, when executed by the processing system, configure the proxy device to: receive an authentication token, wherein the authentication token includes an identity of a user of a client device requesting an access to the cloud-based application; receive, from an agent executed in the client device, a client certificate; retrieve, from the compliance server, a device posture of the client device, wherein the device posture is retrieved respective of the received client certificate; identify an access policy for the client device to access the cloud-based application, wherein the access policy is identified based at least on the retrieved posture; and determine whether to grant an access to the cloud-based application based in part on the compliance of the client device with the identified access policy.

BRIEF DESCRIPTION OF THE DRAWINGS

The subject matter disclosed herein is particularly pointed out and distinctly claimed in the claims at the conclusion of the specification. The foregoing and other objects, features and advantages of the disclosed embodiments will be apparent from the following detailed description taken in conjunction with the accompanying drawings.

DETAILED DESCRIPTION

Figure 1:
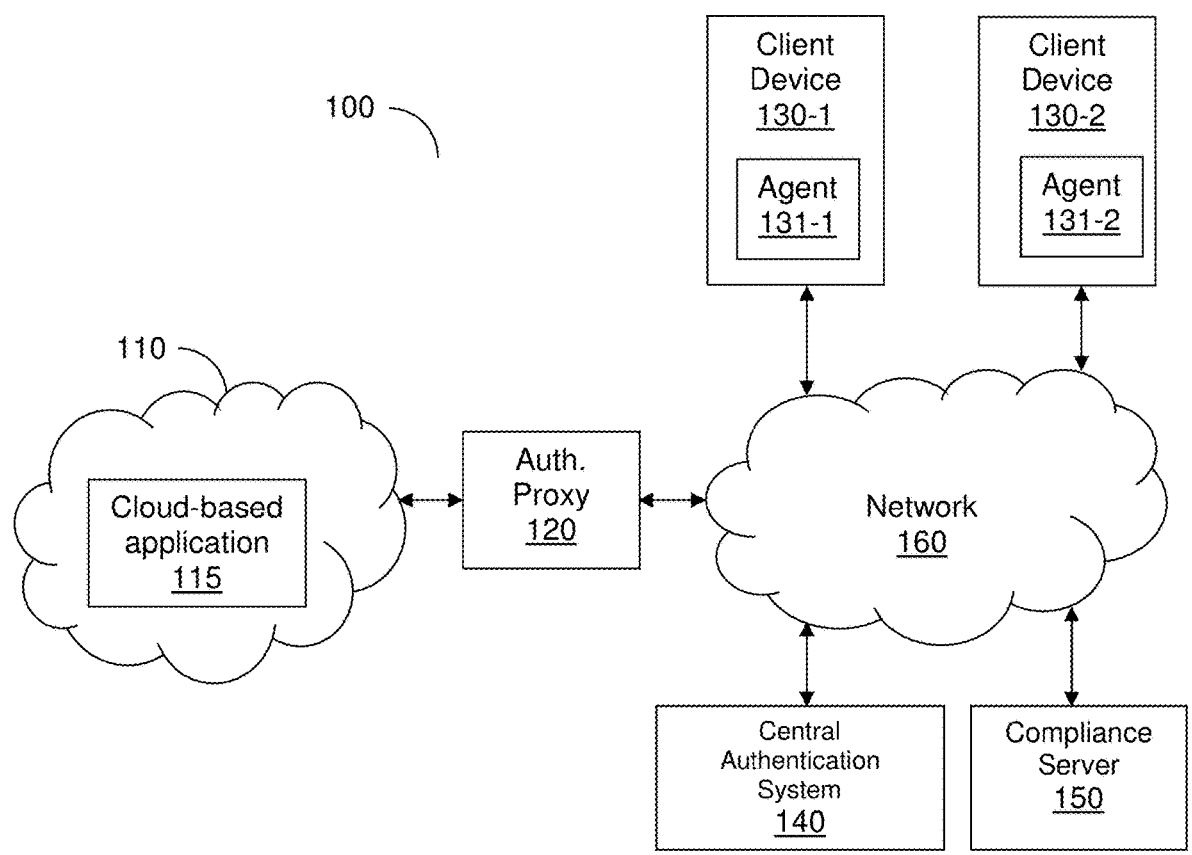
FIG. 1 is a network diagram utilized to describe the disclosed embodiments.

It is important to note that the embodiments disclosed herein are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality. In the drawings, like numerals refer to like parts through several views.

FIG. 1 is an example network diagram of a communication system 100 utilized to describe the various disclosed embodiments. The system 100 includes a cloud computing platform 110 which may be a private cloud, a public cloud, or a hybrid cloud providing computing resources to applications or services executed therein. In the exemplary FIG. 1, a cloud-based application 115 is executed in the cloud computing platform 110. As noted above, the cloud-based application 115 may include, among others, an e-commerce application, a collaboration application, an office and messaging application, a social media application, an enterprise application, a gaming application, a media sharing application, and the like.

The communication system 100 further includes an authentication (auth.) proxy 120, client devices 130-1 and 130-2, a central authentication system 140, and a compliance server 150 that are communicatively connected to a network 160. The network 160 may be, for example, a wide area network (WAN), a local area network (LAN), the Internet, and the like. Each of the client devices 130-1 and 130-2 may include, for example, a personal computer, a laptop, a tablet computer, a smartphone, a wearable computing device, or any other computing device. In exemplary and non-limiting embodiment, the client device 130-1 is a managed device and the client device 130-2 is an unmanaged device. Both devices 130-1 and 130-2 belong to the same user.

It should be noted that, although one cloud-based application 115 two client devices 130 are depicted in FIG. 1 merely for the sake of simplicity, the embodiments disclosed herein can be applied to a plurality of client devices and cloud-based applications.

In an embodiment, the central authentication system 140 may be realized as a federated identity management (FIdM) system, a single-sign-on (SSO) server, or the like. A FIdM system provides means for linking a person's electronic identity and attributes, stored across multiple distinct identity management systems. A SSO server typically ensures that when a user logs in to one application, the user will be signed in to every other application controlled by the SSO server, regardless of the platform, technology and domain. The central authentication system 140 can utilize a lightweight directory access protocol (LDAP) service, persistent cookies, and/or IdP provisioning.

In an embodiment, a request to access the cloud-based application 115 is sent from any of the client devices 130 to the central authentication system 140 and authenticated by the authentication proxy 120, as will be described in detail below.

The compliance server 150 is configured to gather and maintain for each client device 130 a device posture. In an embodiment, the device posture characterizes at least the security capabilities that a client device 130 is configured with. The security capabilities can be related to hardware resources, software resources, and/or network resources of a client device 130. In addition, the security capabilities may be related to a user and/or IT policies of the client device 130. In one embodiment, the device posture includes a unique device certificate associated with the respective client device and a set of compliance parameters. The compliance parameters of each client device 130 are associated with a unique client certificate and can be stored locally in the compliance server 150 or in a database (not shown) connected to the server 150. The gathering of compliance parameters is facilitated using an agent 131.

In an embodiment, the authentication proxy 120 can cause the compliance server 150 to install and execute the agent 131 over a client device 130. The agent 131 is a piece of executable code downloaded from the compliance server 150 (or any other repository connected to the network 160). The agent 131 may be temporarily executed on a client device 130, i.e., without any installation. Alternatively, installation and execution of the agent 131 in the background allows continuous monitoring of a respective client device 130. That is, the agent 131 can operate and be implemented as a stand-alone program or, alternatively, can communicate and be integrated with other programs or applications executed in the client device 130. Alternatively, the agent 131 can be implemented as a script executed over the client device 130.

The agent 131 is configured to scan the respective client device 130 and gather identifiers and security capabilities of the client device 130. The client device's 130 identifiers include, for example, a type, a make, a model, an operating system, and so on. The security capabilities include, for example, whether the likes of any or all of hard-disk encryption, third-party security patches, anti-virus, malware protection, a network access control (NAC), a mobile device management (MDM), password protection, and firewall, are installed and operative in the client device 130. The agent 131 can also determine if the client device 130 is a managed or unmanaged device.

The compliance server 150 is configured to receive the information sent from each agent 131 and to generate the device posture respective thereof. That is, a device posture of a client device 130-1 characterizes the security capabilities that the client device 130-1 is configured with. As noted above, the device posture of a client device 130-1 may include a unique device certificate associated with the client device 130-1 and one or more compliance parameters gathered by the respective agent 131.

As a non-limiting example, the device posture of a client device 130-1 may be different from the device posture of the device 130-2 due to the fact that the former is a managed device and the latter is an unmanaged device. A managed device is typically secured by an IT personnel of an organization, while an unmanaged client device is not. Referring to the above example, the work computer is a managed device while the home computer is an unmanaged device.

In certain exemplary embodiments, in addition to the information gathered by the agent 131 or in lieu of the agents, the device posture can be defined using parameters provided from, for example and without limitation, an end-point Data Loss Prevention (DLP) service, a network access control (NAC) device or service, a mobile device management (MDM) device or service, the central authentication system 140, directory services, and so on.

In an embodiment, a device posture includes at least one compliance parameter indicating a general compliance status of device and a set of compliance parameters indicating a compliance status of each security capability. The general compliance status may be set to "non-compliant" if one or more of the other security capabilities are determined to be "non-compliant" as well. Each compliance parameter may be categorized as critical or not critical. The device posture can further define, for each compliance parameter, the reason for non-compliance.

The compliance parameters indicating a compliance status of each security capability may include, for example, a status of anti-virus software installed in the device (or the existence or lack thereof); a status of malware software installed in the device (or the existence or lack thereof); a status of encryption software installed in the device (or the existence or lack thereof); a status of a public file sharing configuration; a status of encryption anti-phishing software installed in the device (or the existence or lack thereof); a status of the most recent operating system update; a status of a firewall installed in the device (or the existence or lack thereof); a status of each IM application installed in the device (or the existence or lack thereof); a status of backup software installed in the device (or the existence thereof); a status of each remote access application installed in the device (or existence thereof); and so on.

Each compliance parameter may be categorized as critical or not critical. The device posture can further define for each compliance parameter the reason for not being compliant, the vendor to the resource, and the name and version of the resource. For example, the antivirus compliance parameter may include the following information:

Compliance Parameter: "Antivirus";
  Critical: yes
  vendor: "Microsoft Corporation";
  name: "Windows Defender":
  version: "6.1.7600.16385";
  status: Not an approved antivirus product
  compliant: No The device posture may include a number of "critical issues" identified in the device. The device posture may also include a general information about the device, such a MAC address, IP address(es), OS version, a type of the device (desktop, laptop, managed, unmanaged), an available password protection means; a current geographic location, and so on.

In order to retrieve the device posture, the authentication server 120 is configured to query the compliance server 150 using a predefined application programming interface (API). In one example, the compliance server 150 is queries through an API, with the client certificate in order to return the posture of the respective device. In another example, the compliance server 150 is queries through an API, with the client certificate and authentication server in order to return the posture of the respective device.

According to the disclosed embodiments, access to the cloud-based application 115 or any of its components is controlled and enforced by the authentication proxy 120. The authentication proxy 120 is configured to support any token-based authentication protocol. Such protocols include, but are not limited to, WS-Federation®, security assertion markup language (SAML), WS-TRUST, and the like.

In an embodiment, the authentication proxy 120 is configured to determine whether or not to allow a client device 130-1 or 130-2 access to the cloud-based application 115. Such determination is based, in part, on a compliance with a predefined access policy. In one embodiment, the access decision is based at least on device attributes included in the access policy and a definition of a security compliance with the client device 130. Other attributes, discussed below, are also considered by the authentication proxy 120.

The authentication proxy 120 is further configured to determine a trust level of the client device 130 as well as functions and/or components of the cloud-based application 115 that the client device 130 can perform or access. In another embodiment, the authentication proxy 120 is further configured to provide a user of the client device 130 with actions that should be taken (e.g., install anti-virus software) in order to gain access to the cloud-based application 115.

An access policy can be defined for a specific user, a group of users, a specific role (e.g., administrator), a device type (e.g., managed/unmanaged), a schedule (e.g., weekends), a cloud-based application 115, any combination thereof, and so on. For example, different access policies may be defined for users of a finance department and users of a HR department of an enterprise.

In an embodiment, an access policy defines a plurality of attributes and policy actions. The policy actions are, for example, allow full access, block access, and allow limited access. Limited access functionality includes, for example, block native client devices, restrict access to certain components of the cloud-based application 115, and allow the restricted functionality of the cloud-based application 115 (e.g., view only mode, disable download of documents, etc.). In one configuration, the limited access can be contingent upon actions taken by the user, for example, a self-registration, a two-step authentication, running a software update, installing a security patch, and so on. In an embodiment, the limited access actions are controlled by the authentication proxy 120. This is achieved, for example, by redirecting an active session between the cloud-based application and client device, through the proxy 120.

The access policy attributes are categorized by one or more of the following groups: a user, a client device, and a location. The user attributes include a user identify (e.g., a username), a user group (e.g., HR department), and a user account history. The user account history is defined respective of past user activities (typically, suspicious and/or malicious activities) associated with the user account. The client device attributes include a client certificate and compliance parameters, such as those gathered by the compliance server 150.

The client device attributes may also include a device history and a device posture. The device history is defined respective of past user activities performed from a client device 130. In an embodiment, the access policies can be defined by IT personnel of the enterprise, for example, through a web-portal provided by the authentication proxy 120. The location attributes include risky, known, and/or reliable locations of the client devices 130 determined by their IP addresses.

In an embodiment, the decision to allow access to the cloud-based application 115 and/or any of its components may be based on any of the attributes defined in the access policy. In a preferred embodiment, at least one of the device attributes as defined in the access policy should be met in order to permit access.

As an example, if the access policy defines as a part of the device attributes that only managed devices can access the cloud-based application 115 and only the client device 130-1 is a managed device, then an access is granted to only the client device 130-1. The information of whether a device is managed or unmanaged is retrieved from the compliance server 150.

According to the disclosed embodiments, in order to access the cloud-based application 115, a client device, e.g., the device 130-1, by means of its web browser, receives a login webpage of the cloud-based application 115. Then, the client device 130-1 is directed to the central authentication system 140.

When the user successfully authenticates to the central authentication system 140, an authentication token is transferred from the central authentication system 140 to the authentication proxy 120. In one implementation, the central authentication system 140 is configured to cause redirection of the client device's 130-1 browser to the authentication proxy 120.

Upon receiving the authentication token, the authentication proxy 120 is configured to check if the agent 131 is installed in the client device 130-1. In an embodiment, the authentication proxy 120 is further configured to check if a valid client certificate resides in the client device 130-1. As noted above, the client certificate is a unique identifier of each client device.

In an embodiment, if the client device 130-1 does not include an installed agent 131, the authentication proxy 120 is configured to cause the execution of an agent on the device 130-1. According to some embodiments, the authentication proxy 120 is configured to direct the client device's 130-1 browser (not shown) to the compliance server 150 that would provide the various options for installing and/or running the agent 131 on the client device 130-1. If the user opted not to run the agent 131, access to the cloud-based application 115 can be determined based on other attributes defined the access profile (e.g., location, device history, etc.).

As discussed above, the agent 131, once executed, is configured to scan the client device 130-1 and to provide a set of compliance parameters to the server 150. In an embodiment, once the scanning of the agent 131 is completed, the client device's 130-1 browser is directed again to the authentication proxy 120, this time with the client certificate saved in the client device 130-1 during the execution of the agent 131. The authentication proxy 120 is further configured to query the compliance server 150 using the client certificate to retrieve at least the device posture.

Then, an access policy utilized for the client device 130-1 is identified. The authentication proxy 120 is configured with a plurality of access policies (per users, group of users, schedule, etc.). The access policy to be evaluated and analyzed is identified based on, for example, a username (or any other user identifier, such as an email, a telephone number, etc.), user's group or department, time, application being accessed, and so on. Such information can be obtained from, for example, the central authentication system 140, directory services (e.g., LDAP), and so on.

Upon identification of the access policy utilized for the client device 130-1, the authentication proxy 120 is configured to check for satisfaction of any attribute (or condition) defined in the identified access policy. Respective of the checks and the policy actions, the authentication proxy 120 is configured to determine whether to allow a full access, a limited access, or block any access to the cloud-based application 115. The limited access actions are controlled by the proxy 120. This is achieved, for example, by redirecting an active session between the cloud-based application and client device, through the proxy 120.

In an embodiment, the satisfaction checks are performed using information generated by the authentication proxy 120 or received from other systems, such as the central authentication system 140 and the compliance server 150, external reputation services, LDAP services, and so on.

Following are non-limiting examples demonstrating the satisfaction checks, in which the user identity is checked against information included in the authentication token. The user group attribute may be evaluated based on group information received from an LDAP directory, active directory, and user groups and roles defined in the cloud-based application 115.

The device attributes are evaluated based on the device posture retrieved from the compliance server 150, while the device identity and user history are evaluated by the authentication proxy 120. For example, the authentication proxy 120 can track past user activities performed from the client device 130-1 and compare those past user activities to conditions defined in the access policy. Such conditions include, for example, a number of past security incidents, access from suspicious locations, and so on.

To determine satisfaction of the location attributes, the authentication proxy 120 is configured to track risky IP addresses, known IP addresses, known office locations, VPN IP addresses, ISPs, and so on. In an embodiment, the authentication proxy 120 is also configured to learn the user past activities to determine known locations of the user (e.g., a home location, a bus terminal from which the user commutes, etc.). In an embodiment, the authentication proxy 120 may consult reputation services to determine if a location is a "risky location".

The determined locations are matched against the location attributes defined in the policy. Such attributes can be simply defined as "user accessing from a location never visited by anyone in the company", "user accessing from an unrevealed location", "user accessing from home", a specific IP address or addresses, specific countries, and so on.

It should be noted that not all attributes need to be evaluated and only a sub-set of attributes or conditions can be evaluated prior to deciding on the policy action to be taken. For example, upon determination that the client device 130-2 is unmanaged, access to the application can be blocked. It should be further noted that the policy action can be determined based on satisfaction of any combination of attributes. As an example, if the client device 130-1, which is a managed device, will comply with the user and device attributes. However, if the client device 130-1 accesses the cloud-based application 115 from an unknown location, the policy action may be a two-step authentication (in which a passcode is sent to the user through a secondary channel). In an embodiment, any access policy includes at least the device attributes.

The above embodiments are described with reference to the client device 130-1 merely for the sake of simplicity. The same authentication process may be performed for each client device regardless of whether the device is managed or unmanaged. For unmanaged devices, the access to the cloud-based application 115 may be restricted.

As an example, if the device posture of the client device 130-2 would indicate that the operating system is not installed with the latest security update, then an access to the cloud-based application 115 may be permitted only if a software update takes place. As another example, if the device posture of the client device 130-2 would indicate that the hard disk is not encrypted, then an access to the cloud-based application 115 would be limited to viewing, but not downloading, documents. As yet another example, if the device posture of the client device 130-2 would indicate that the client device 130-2 is not password protected, then an access to the cloud-based application 115 would be blocked.

In an embodiment, if the access to the cloud-based application 115 is denied, a message is generated by the proxy 120 and displayed over the client device 130. The message may identify the reason for denying the access and remedial actions to be taken by the user (e.g. an administrator) of the client device. The message may be generated in part based on information contained in the client device 130.

Figure 4:
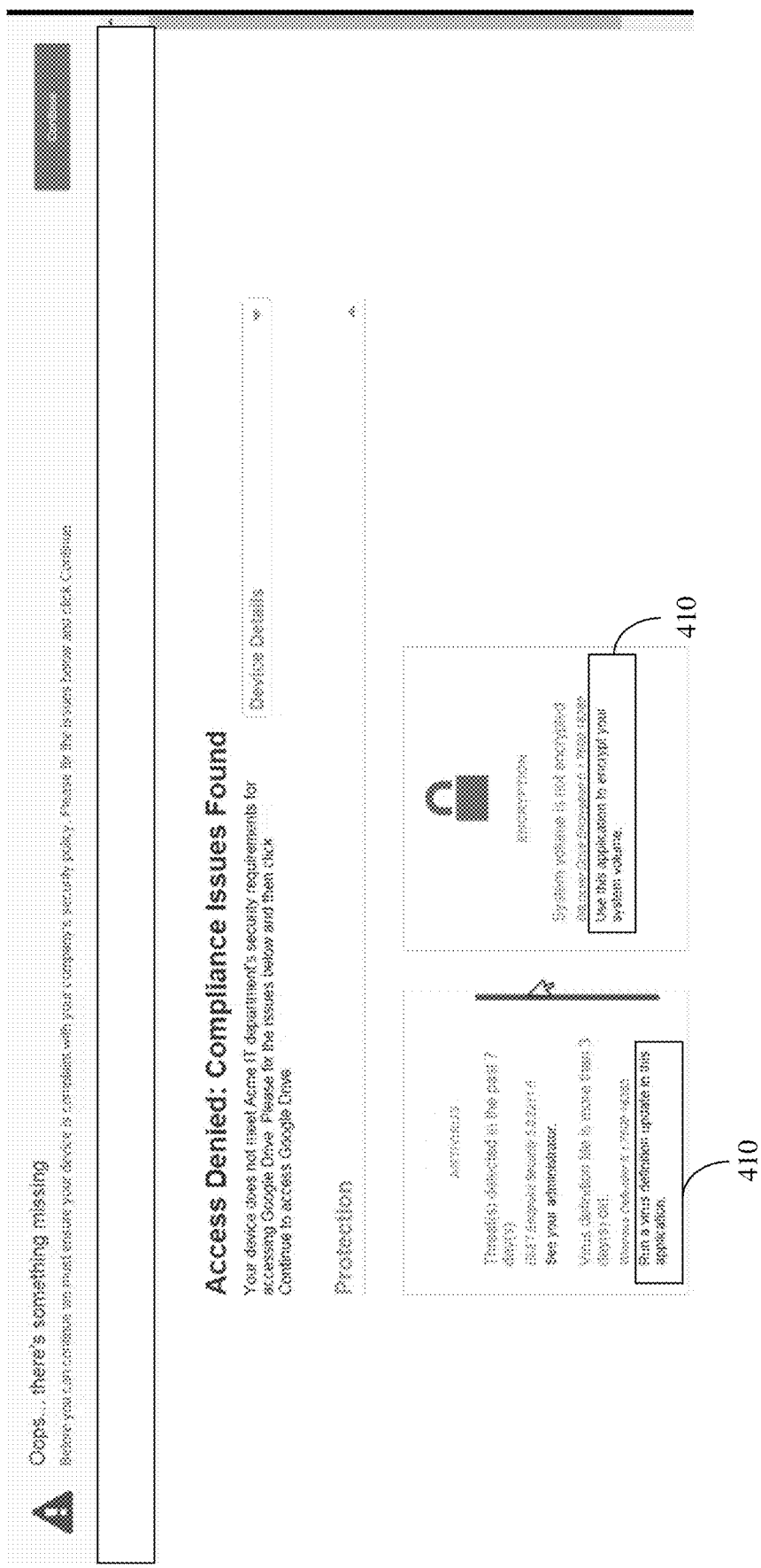
FIG. 4 is a screenshot showing an access denied message generated according to an embodiment.

FIG. 4 shows an example screenshot 400 of an "access denied message" displayed over the client device 130. As demonstrated in FIG. 4, access was denied because the antivirus software is out of date and the disk is not encrypted. The remedial actions (in blocks 410) suggest updating the antivirus file and encrypting the disk.

It should be understood that the embodiments disclosed herein are not limited to the specific architecture illustrated in FIG. 1 and other architectures may be equally used without departing from the scope of the disclosed embodiments. Specifically, the authentication proxy 120 may reside in the cloud computing platform 110, a different cloud computing platform, or a connectable datacenter. Moreover, in an embodiment, there may be a plurality of authentication proxies 120 operating as described hereinabove and configured to either have one as a standby proxy to take control in a case of failure, to share the load between them, or to split the functions between them. Furthermore, without departing from the scope of the disclosed embodiments, various functions of the compliance server 150 may be implemented by the authentication proxy 120.

Figure 2:
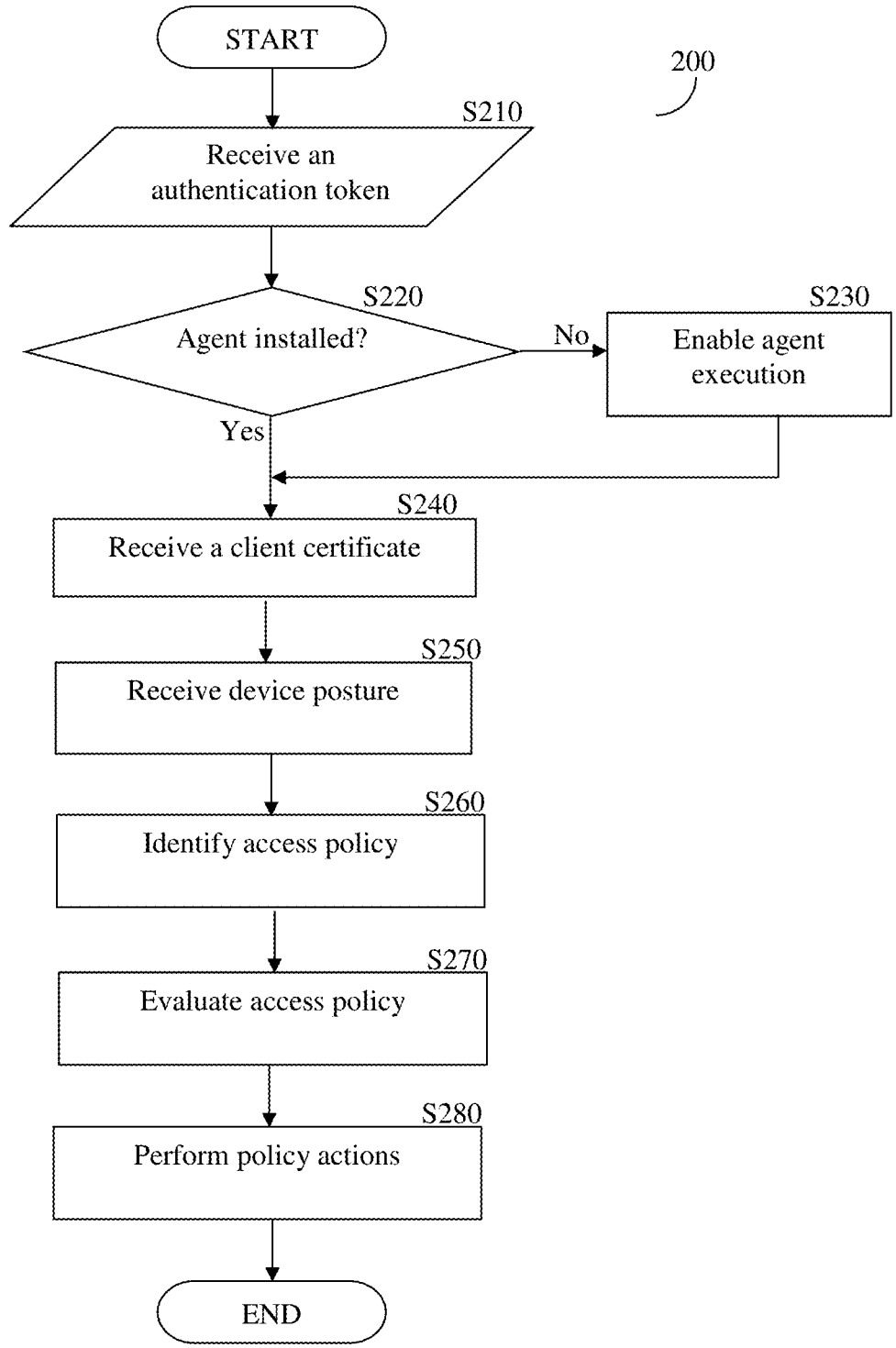
FIG. 2 is a flowchart illustrating the operation of an authentication proxy according to one embodiment.

FIG. 2 depicts an example flowchart 200 illustrating the operation of the authentication proxy 120 for controlling and enforcing access to a cloud-based application according to one embodiment.

At S210, an authentication token is received. In an embodiment, the authentication token includes the identity of a user of a client device accessing the cloud-based application. The authentication token may be provided by a central authentication system (e.g. the system 140, FIG. 1).

At S220, it is checked whether an agent is installed in the client device and, if so, execution continues with S240; otherwise, execution continues with S230. In an example embodiment, the check whether the agent is installed is performed respective of an existence of a valid client certificate. Prior to execution of the agent, it is checked whether the client device includes a valid state cookie (or any other type of data structure). The state cookie maintains compliance parameters recently gathered by an agent. The state cookie is valid for a predefined time interval (e.g., 3 days).

At S230, execution of the agent in the client device is enabled. In an embodiment, S230 may include causing installation of the agent in the client device.

At S240, a client certificate associated with the client device is received. Such a certificate was either previously created by an agent already installed in the device or by agent that was executed on the client device in response to S230.

At S250, at least the device posture is retrieved. In an embodiment, the device posture is retrieved from a compliance server using the received client certificate and/or authentication token. In an optional embodiment, if the valid state cookie exists in the client device, information is retrieved directly from the client device. Thus, the compliance server may not be required and, accordingly, may not be queried. Various examples for the contents of a device posture are provided above.

At S260, an access policy for controlling an access of the client device to the cloud-based application is identified. The access policy is identified based on, for example, a user unique identifier, user's group or department, time, application being accessed, and so on.

At S270, the attributes and/or conditions defined in the identified access policy are evaluated to determine if one or more of the attributes (or conditions) are satisfied. The satisfaction checks are performed using information generated by the authentication proxy 120 or received from other systems, such as the central authentication system 140 and the compliance server 150, external reputation services, LDAP services, and so on.

At S280, respective of the met or unmet attributes (or conditions) the policy action defined in the identified access policy is performed. Various embodiments and examples for performing S260, S270 and S280 are discussed in greater detail above.

The operation of the authentication proxy 120 has been described herein with a reference to a specific embodiment, where an identity of a client device is validated based on a client certificate. It should be noted that the other device validation mechanisms can be utilized as well without compromising the operation of the proxy 120. For example, a persistent cookie can be utilized instead of the client certificate.

In an embodiment, an advanced validation mechanism based on registering web-based protocol handlers is disclosed. In this embodiment, a browser of a client device 130 initiates a protocol handler call with a unique session identifier (ID). The protocol handler sends the authentication proxy 120 a coupling between the device ID and the session ID. Such coupling allows the web browser to uniquely identify the client device 130.

In another embodiment, detection techniques to prevent reuse of device IDs are disclosed. In this embodiment, a state with a counter value is stored on the client device 130. At every login to the cloud-based application 115, the counter value is increased. When two or more client devices 130 with the same device ID attempt to access the cloud-based application 115, the state will be out of synchronization and the breach will be immediately detected.

Figure 3:
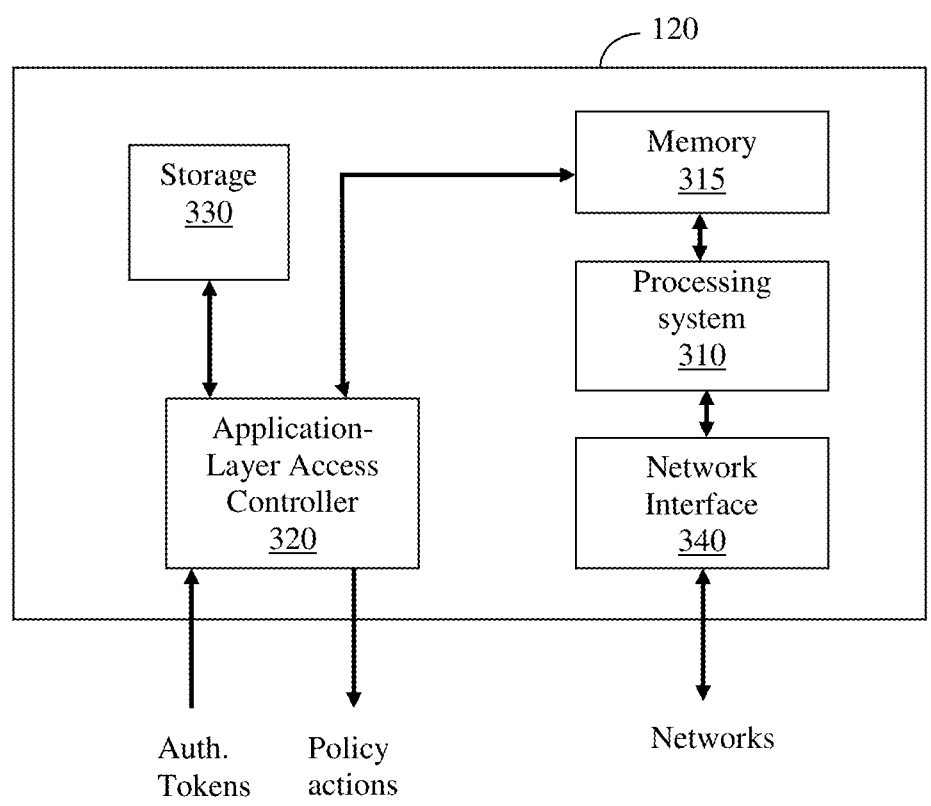
FIG. 3 is a block diagram of the authentication proxy constructed according to one embodiment.

FIG. 3 shows an example block diagram of the authentication proxy 120 constructed according to one embodiment. The authentication proxy 120 may be deployed in cloud-computing platforms, data centers, or as a stand-alone network device. The authentication proxy 120 is configured to at least control and enforce access to cloud-based applications based on access policies described in greater detail above. The authentication proxy 120 includes a processing system 310 coupled to a memory 315, an application-level access controller 320, a storage 330, and a network interface 340.

The processing system 310 may be realized by one or more hardware logic components and circuits. For example, and without limitation, illustrative types of hardware logic components that can be used include Field Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), general-purpose microprocessors, microcontrollers, digital signal processors (DSPs), and the like, or any other hardware logic components that can perform calculations or other manipulations of information. The memory 315 may be volatile (e.g., RAM, etc.), non-volatile (e.g., ROM, flash memory, etc.), or a combination thereof.

The storage 330 may be magnetic storage, optical storage, and the like and may be realized, for example, as flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information.

In one configuration, computer readable instructions to implement one or more embodiments disclosed herein may be stored in the storage 330. The storage 330 may also store other computer readable instructions to implement an operating system, an application program, and the like. Computer readable instructions may be loaded in the memory 315 for execution by the processing system 310. The storage 330 is configured to store, for example, access policies, client certificates, authentication tokens, device postures of client devices, device history, user account history, and other information that can be for authentication.

In another embodiment, the storage 330 and/or memory 315 are configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 310 to perform the various functions described herein.

The network interface 340 allows the authentication proxy 120 to communicate with other external devices. For example, the interface 340 is configured to allow the proxy 120 to communicate with the central authentication system, the cloud computing platform, the compliance server, and/or client devices over a network. In an embodiment, the network interface 340 allows remote access to the authentication proxy 120 for the purpose of, for example, configuration, reporting, etc. Such a connection, in an embodiment, can be realized through a web portal. The network interface 340 may include a wired connection or a wireless connection. The network interface 340 may transmit and/or receive communication media. For example, the network interface 340 may include a modem, a network interface card (NIC), an integrated network interface, a radio frequency transmitter/receiver, an infrared port, a USB connection, and the like.

The application-level access controller 320 is configured to retrieve information required to determine if the attributes and conditions defined in the access policies are met. Such information can be retrieved from the network interface 340 via the central authentication system, the compliance server, and/or other external systems.

The controller 320 is further configured, upon receiving a request to access a cloud-based application, to identify at least one access policy. The request may comprise an authentication token. The access control module 320 is further configured to execute a policy action respective of the identified access policy analysis. The operation of the access control module 320 is discussed in greater detail above with reference to FIG. 2.

In an embodiment, the application-level access controller 320 can be realized by one or more hardware logic components and circuits. For example, and without limitation, illustrative types of hardware logic components that can be used include FPGAs, ASICs, ASSPs, SOCs, CPLDs, general-purpose microprocessors, DSPs, and the like, or any other hardware logic components that can perform calculations or other manipulations of information.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for securing an access to a cloud-based application, comprising:
receiving, by an authentication proxy device, an authentication token, wherein the authentication token includes an identity of a user of a client device requesting an access to the cloud-based application, wherein the client device is at least an un-managed device, and wherein the authentication proxy device is connected between the un-managed client device and a cloud computing platform hosting the cloud-based application to be secured, wherein the un-managed client device is not secured by an organization;
receiving, from an agent executed in the un-managed client device, a client certificate;
retrieving, from a compliance server, a device posture of the un-managed client device, wherein the device posture is retrieved respective of the received client certificate;
identifying an access policy, from among a plurality of access polices configured with the authentication proxy device, for the un-managed client device to access the cloud-based application, wherein the access policy is identified based at least on the retrieved device posture; and
determining whether to grant an access to the cloud-based application based in part on the compliance of the un-managed client device with the identified access policy.

2. The method of claim 1, further comprising:
checking if the agent is installed in the un-managed client device; and
causing at least one of: installation of the agent in the un-managed client device and execution of the agent in the un-managed client device, when the un-managed client device does not include the agent.

3. The method of claim 1, wherein the device posture characterizes at least security capabilities that the un-managed client device is configured with.

4. The method of claim 3, wherein the device posture includes at least a set of compliance parameters and a unique certificate associated with the un-managed client device.

5. The method of claim 4, wherein each compliance parameter includes a compliance status of at least one of: at least one security capability of the un-managed client device.

6. The method of claim 4, wherein the device posture is compiled using information provided by at least one of: a central authentication system, an end-point Data Loss Prevention (DLP) service, a network access control (NAC) service, and a mobile device management (MDM) service.

7. The method of claim 1, wherein the access policy includes a plurality of attributes, a plurality of conditions, and a policy action.

8. The method of claim 7, wherein determining whether to grant an access to the cloud-based application further comprises:
determining which of the plurality of conditions and of the plurality of attributes set in the access policy are met; and
allowing an access to the cloud-based application based on the determined met conditions and attributes.

9. The method of claim 8, wherein the policy action includes any one of:
allow full access, block access, and allow limited access.

10. The method of claim 8, wherein the determination of which of the plurality of conditions and attributes are met is performed using information retrieved from at least one of: a central authentication system, a compliance server, an external reputation service, and a lightweight directory access protocol (LDAP) service.

11. The method of claim 1, further comprising: securing an access to the cloud-based application by a managed client device, wherein the managed client device and the un-managed client device are of the same user.

12. The method of claim 1, wherein the authentication token is received from a central authentication system, wherein the central authentication system is any of: a federated identity management (FIdM) system, and a single-sign-on (SSO) server.

13. A non-transitory computer readable medium having stored thereon instructions for causing one or more processing units to execute the method according to claim 1.

14. An authentication proxy device for securing an access to a cloud-based application, wherein the authentication proxy device is connected between a client device and a cloud computing platform hosting the cloud-based application, comprising:
a processing system; and
a memory, the memory containing instructions that, when executed by the processing system, configure the proxy device to:
receive an authentication token, wherein the authentication token includes an identity of a user of a client device requesting an access to the cloud-based application, wherein the client device is at least an un-managed device, wherein the un-managed client device is not secured by an organization;
receive, from an agent executed in the un-managed client device, a client certificate;
retrieve, from a compliance server, a device posture of the un-managed client device, wherein the device posture is retrieved respective of the received client certificate;
identify an access policy, from among a plurality of access polices configured with the authentication proxy device, for the un-managed client device to access the cloud-based application, wherein the access policy is identified based at least on the retrieved posture; and
determine whether to grant an access to the cloud-based application based in part on the compliance of the un-managed client device with the identified access policy.

15. The proxy device of claim 14, wherein the proxy device is further configured to:
check if the agent is installed in the un-managed client device; and
cause at least one of installation of the agent in the un-managed client device and execution of the agent in the un-managed client device, when the un-managed client device does not include the agent.

16. The proxy device of claim 14, wherein the device posture characterizes at least security capabilities that the un-managed client device is configured with.

17. The proxy device of claim 16, wherein the device posture includes at least a set of compliance parameters and a unique certificate associated with the un-managed client device.

18. The proxy device of claim 17, wherein each compliance parameter includes a compliance status of at least one of: at least one security capability of the un-managed client device.

19. The proxy device of claim 17, wherein the device posture is compiled using information provided by at least one of: a central authentication system, an end-point Data Loss Prevention (DLP) service, a network access control (NAC) service, and a mobile device management (MDM) service.

20. The proxy device of claim 14, wherein the access policy includes a plurality of attributes, a plurality of conditions, and a policy action.

21. The proxy device of claim 20, wherein the proxy device is further configured to:
determine which of the plurality of conditions and of the plurality of attributes set in the access policy are met; and
allow an access to the cloud-based application based on the determined met conditions and attributes.

22. The proxy device of claim 21, wherein the determination of which of the plurality of conditions and attributes are met is performed using information retrieved from at least one of: a central authentication system, a compliance server, an external reputation service, and a lightweight directory access protocol (LDAP) service.

23. The proxy device of claim 20, wherein the policy action includes any one of: allow full access, block access, and allow limited access.

24. The proxy device of claim 14, further comprising:
securing an access to the cloud-based application by a managed client device, wherein the managed client device and the un-managed client device are of the same user.

25. The proxy device of claim 14, wherein the authentication token is received from a central authentication system, wherein the central authentication system is any of: a federated identity management (FIdM) system, and a single-sign-on (SSO) server.

26. A cloud computing platform, comprising:
at least one server configured to host at least one cloud-based application;
a compliance server;
an authentication proxy device connected between the client device and the at least one server hosting the cloud-based application to be secured, wherein the authentication proxy device includes a processing system and a memory; the memory containing instructions that, when executed by the processing system, configure the authentication proxy device to:
receive an authentication token, wherein the authentication token includes an identity of a user of a client device requesting an access to the cloud-based application, wherein the client device is at least an un-managed device, wherein the un-managed client device is not secured by an organization;
receive, from an agent executed in the un-managed client device, a client certificate;
retrieve, from the compliance server, a device posture of the un-managed client device, wherein the device posture is retrieved respective of the received client certificate;
identify an access policy, from among a plurality of access polices configured with the authentication proxy device, for the un-managed client device to access the cloud-based application, wherein the access policy is identified based at least on the retrieved posture; and
determine whether to grant an access to the cloud-based application based in part on the compliance of the un-managed client device with the identified access policy.

* * * * *